United States Patent
Ly et al.

(10) Patent No.: US 11,975,397 B2
(45) Date of Patent: May 7, 2024

(54) DELTA-PHASE BRASS ELECTRODE WIRE FOR ELECTROEROSION MACHINING, AND METHOD FOR MANUFACTURING SAME

(71) Applicant: THERMOCOMPACT, Epagny Metz-Tessy (FR)

(72) Inventors: Michel Ly, Annecy (FR); Gérald Sanchez, Dingy Saint Clair (FR)

(73) Assignee: THERMOCOMPACT, Epagny Metz-Tessy (FR)

(*) Notice: Subject to any disclaimer, the term of this patent is extended or adjusted under 35 U.S.C. 154(b) by 556 days.

(21) Appl. No.: 17/293,060

(22) PCT Filed: Dec. 19, 2019

(86) PCT No.: PCT/IB2019/061104
§ 371 (c)(1),
(2) Date: May 12, 2021

(87) PCT Pub. No.: WO2020/128953
PCT Pub. Date: Jun. 25, 2020

(65) Prior Publication Data
US 2021/0402497 A1    Dec. 30, 2021

(30) Foreign Application Priority Data
Dec. 21, 2018    (FR) .................... 18 73971

(51) Int. Cl.
*B23H 7/08*     (2006.01)
*C22C 18/02*    (2006.01)
*C22F 1/08*     (2006.01)
*C22F 1/16*     (2006.01)
*C23C 28/02*    (2006.01)

(52) U.S. Cl.
CPC ............. *B23H 7/08* (2013.01); *C22C 18/02* (2013.01); *C22F 1/165* (2013.01); *C23C 28/021* (2013.01); *C23C 28/025* (2013.01)

(58) Field of Classification Search
None
See application file for complete search history.

(56) References Cited

U.S. PATENT DOCUMENTS

| | | | |
|---|---|---|---|
| 6,176,994 B1 * | 1/2001 | Lacourcelle | C25D 3/66 |
| | | | 205/228 |
| 2009/0025959 A1 * | 1/2009 | Tomalin | B32B 15/01 |
| | | | 427/59 |
| 2015/0360309 A1 * | 12/2015 | Sugimura | B21C 1/02 |
| | | | 72/274 |
| 2017/0014928 A1 * | 1/2017 | Chang | B23H 7/08 |

FOREIGN PATENT DOCUMENTS

| | | | | |
|---|---|---|---|---|
| EP | 2517817 A2 * | 10/2012 | | B21C 1/003 |
| FR | 2936727 A1 | 4/2010 | | |

OTHER PUBLICATIONS

Lenz et al, Some vacancy and stacking variants of the beta brass structural family, IEE, Nov. 1971.

* cited by examiner

*Primary Examiner* — Geoffrey S Evans
(74) *Attorney, Agent, or Firm* — William H. Eilberg (57) ABSTRACT

An electrode wire for electroerosion machining, the electrode wire including a metal core, made of one or more layers of metal or metal alloy. On the metal core there is a coating having an alloy different from that of the metal core, and containing more than 50% by weight of zinc. The coating includes delta-phase copper-zinc alloy.

16 Claims, 5 Drawing Sheets

DELTA-PHASE BRASS ELECTRODE WIRE FOR ELECTROEROSION MACHINING, AND METHOD FOR MANUFACTURING SAME

TECHNICAL FIELD OF THE INVENTION

The present invention relates to the electrode wires used for cutting metals or electrically conductive materials by electrical discharge machining in a device for machining by electrical discharge machining.

The well-known process of electrical discharge or spark erosion machining makes it possible to remove material on an electrically conductive part by generating sparks in a machining zone between the part to be machined and an electrically conductive electrode wire. The electrode wire unwinds continuously in the vicinity of the part in the direction of the length of the wire, held by guides, and it is moved progressively in the transverse direction in the direction of the part, either by transverse translation of the guides of the wire or by translation of the part.

An electrical generator, connected to the electrode wire by electrical contacts away from the machining zone, establishes an appropriate potential difference between the electrode wire and the conductive part to be machined. The machining zone between the electrode wire and the part is immersed in a suitable dielectric fluid. The potential difference causes, between the electrode wire and the part to be machined, the appearance of sparks which gradually erode the part and the electrode wire. The longitudinal movement of the electrode wire makes it possible to permanently maintain a sufficient wire diameter to prevent it from breaking in the machining zone. The relative movement of the wire and of the part in the transverse direction makes it possible to cut the part or to treat its surface, if appropriate.

The particles detached from the electrode wire and from the part by the sparks disperse in the dielectric fluid, where they are discharged.

The obtaining of machining precision, in particular the production of cuts with an angle having a low radius, requires the use of wires with a small diameter and supporting a large mechanical breaking load in order to be tensioned in the machining zone and to limit the amplitude of the vibrations.

Most modern devices for machining by electrical discharge machining are designed to use metal wires, generally with a diameter of 0.25 mm and with a breaking load of between 400 and 1000 $N/mm^2$.

When a spark occurs between the electrode wire and the part, the surface of the electrode wire is suddenly heated to a very high temperature for a brief period of time. The result of this is that the material of the surface layer of the electrode wire, at the location of the spark, changes from the solid state to the liquid or gaseous state, and is displaced at the surface of the electrode wire and/or evacuated in the dielectric fluid. It is found that the surface zone of the electrode wire reached by the spark has been deformed, generally taking a slightly concave crater shape, with zones where the material has been melted and re-solidified.

It could be observed that the effectiveness of the sparks with regard to electrical discharge machining largely depends on the nature and on the topography of the surface layer of the electrode wire. For this, considerable progress in electrical discharge machining efficiency has been obtained by using electrode wires comprising a core made of one or more metals or alloys providing good conduction of the electric current and good mechanical strength, in order to maintain the mechanical tensile load of the wire, and comprising a coating made of one or more other metals or alloys and/or a specific topography, for example fractures, providing better efficiency of the electrical discharge machining, for example a greater speed of erosion.

Electrode wires have thus been provided having a brass core covered with zinc, the zinc having the property of evaporating rapidly during the spark while simultaneously preventing excessive heating of the core of the electrode wire. For example, the document FR 2 936 727 A describes an electrode wire comprising a metal core, made of one or more layers of metal or of metal alloy, and a coating having an alloy different from that of the metal core and containing more than 50% by weight of zinc. The document describes coatings in delta phase of zinc-iron alloy or of zinc-nickel alloy. The delta phase of these alloys is stable at ambient temperature, which makes it easier to obtain them. However, the machining speed of such electrode wires is not optimal.

Furthermore, electrode wires have been provided, the core of which is covered with one or more layers of copper and zinc alloys, for example a fractured surface layer of gamma-phase copper and zinc alloy surmounting an intermediate layer of beta-phase copper and zinc alloy, or also a surface layer of epsilon-phase copper and zinc alloy which surmounts a layer of gamma-phase copper and zinc alloy, itself surmounting a layer of beta-phase copper and zinc alloy. This particular coating structure is targeted at ensuring generally a higher speed of machining of a part by electrical discharge machining.

However, there still remains a need to increase the speed of machining by electrical discharge machining, for a given current intensity for spark machining.

The present invention results from observations according to which, during its passage through the machining zone of a device for electrical discharge machining where an electrical discharge machining process takes place, one and the same surface of the electrode wire generally receives several successive sparks. The result of this is that, after a first spark affecting said surface of the electrode wire, a subsequent spark occurs on a surface which has been modified by said first spark and the other intermediate sparks. In other words, the sparks progressively modify the surface of the electrode wire, which can affect the efficiency of the subsequent sparks with regard in particular to the speed of electrical discharge machining.

In particular, a first spark not only has the action of eroding the surface of the electrode wire and the surface of the part to be machined, but also of locally modifying the coating of the electrode wire by melting and recomposing the material. Thus, the surface material of the coating, which has been recomposed, is generally an alloy of copper and zinc in a phase which differs from that of the surface layer of the electrode wire in its initial state, which thus no longer exhibits the same properties with regard to the electrical discharge machining produced by the subsequent sparks.

Likewise, a first spark not only has the action of eroding the surface of the electrode wire and the surface of the part to be machined, but also of locally modifying the topography of the coating of the electrode wire by the melting of the material, which may flow and cover any fractures or cavities which were present at the surface of the electrode wire in its initial state.

Thus, the idea which is at the basis of the invention is to preserve an electrode wire surface layer having good erosive efficiency throughout its journey through the machining zone during machining by electrical discharge machining, by reducing as much as possible the deterioration in this efficiency by the successive machining sparks. In this way, a surface zone of the coating of the electrode wire can maintain good erosive efficiency for a longer portion of its journey through the machining zone where the electrical discharge machining sparks are produced.

DISCLOSURE OF THE INVENTION

A problem provided by the present invention is to design an electrode wire, the structure of which makes it possible to increase the speed of machining by electrical discharge machining, for a given current intensity for spark machining.

Another problem provided by the invention is to economically manufacture such an electrical discharge machining wire which makes possible a greater speed of machining by electrical discharge machining for a given current intensity for spark machining.

To achieve these and other objects, according to a first aspect, the invention provides an electrode wire for machining by electrical discharge machining, said electrode wire comprising:
- a metallic core, made of one or more layers of metal or of metallic alloy,
- on the metallic core, a coating having an alloy different from that of the metallic core and containing more than 50% by weight of zinc, in which the coating comprises zones made of delta-phase copper-zinc alloy.

The electrode wire for machining by electrical discharge machining, when it is stored and then transported until it is ready for machining at the inlet of a device for electrical discharge machining, is at ambient temperature, that is to say a temperature generally of between 15° C. and 30° C.

At these temperatures, the delta-phase copper-zinc alloy is in a metastable state.

Zones of delta-phase copper-zinc alloy can be present in a continuous coating layer, or in a coating which contains cracks.

The inventors of the present invention have observed that, in comparison with zones made of a mixture of gamma-phase copper and zinc alloy and of epsilon-phase copper and zinc alloy of the same overall composition, when they are subjected to an intense and short-lived machining spark, the zones of delta-phase copper-zinc alloy produce less liquid. It can be observed, for example, that craters resulting from electrical discharge machining sparks have fewer re-solidified zones when the delta phase of this alloy is present in the coating of the electrode wire.

When the amount of liquid produced is less, the electrode wire loses less material during the spark. It is thus possible to reduce the rate of forward progression of the electrode wire, and thus the consumption of electrode wire, while maintaining a good machining speed.

Moreover, when the amount of liquid produced is less, there are fewer fractures or pores which are occluded by the flow of liquid, so that the surface topography of the electrode wire is better preserved. The machining speed is thus increased.

According to a first embodiment, in the electrode wire according to the invention, the delta-phase copper-zinc alloy forms at least one layer of alloy in the coating.

For example, said at least one layer of delta-phase copper-zinc alloy can advantageously be a surface layer of the coating. It is thus directly stressed by the electrical discharge machining sparks.

The layer of delta-phase copper-zinc alloy can be fractured.

According to a first possibility, the coating of the electrode wire can comprise a fractured layer of gamma-phase copper-zinc alloy surmounted by said at least one layer of delta-phase copper-zinc alloy.

In this case, said at least one layer of delta-phase copper-zinc alloy can advantageously have a thickness of between 30% and 100% of the thickness of said fractured layer of gamma-phase copper-zinc alloy.

According to a second possibility, the coating can comprise a layer of beta-phase copper-zinc alloy, surmounted by a fractured layer of gamma-phase copper-zinc alloy, itself surmounted by said at least one layer of delta-phase copper-zinc alloy, itself surmounted by a layer of epsilon-phase copper-zinc alloy.

According to an advantageous embodiment, the electrode wire according to the invention can comprise a coating having a layer of gamma-phase copper-zinc alloy containing pores which are covered by said at least one layer of delta-phase copper-zinc alloy.

In general, the layer of delta-phase copper-zinc alloy can be continuous. Alternatively, the layer of delta-phase copper-zinc alloy can be fractured (by drawing the electrode wire).

According to another aspect, the invention provides various processes for manufacturing an electrode wire for machining by electrical discharge machining, said electrode wire comprising a metallic core and a coating comprising delta-phase copper-zinc alloy. These various processes generally comprise the following stages:
- (a) taking a blank wire made of metal,
- (b) producing, on this blank wire, a coating having zones, the mean composition of which corresponds to the range (D) of existence of the delta-phase copper-zinc alloy,
- (c) bringing the coated blank wire to a temperature of between 559° C. and 700° C., preferably between 559° C. and 600° C., at which temperature the copper-zinc alloy delta phase is stable,
- (d) suddenly cooling the coated blank wire so as to keep the delta-phase copper-zinc alloy in a metastable state at ambient temperature.

According to a first embodiment, such a process comprises the following stages:
- during stage (a), choosing a blank wire having copper on the surface, for example made of copper alloy, or of copper and zinc alloy,
- producing a first coating of zinc on this blank wire,
- carrying out a first diffusion heat treatment so as to obtain a sub-layer of beta-phase copper and zinc alloy and an external layer of gamma-phase copper and zinc alloy,
- producing a second coating of zinc,
- carrying out a second diffusion heat treatment at a temperature of less than 170° C. so as to obtain, at the surface of the wire, an external layer made of epsilon-phase copper and zinc alloy while retaining the lower layers made of beta-phase copper and zinc alloy and gamma-phase copper and zinc alloy previously produced,
- bringing the wire to a temperature of between 559° C. and 700° C., preferably between 559° C. and 600° C., more preferably between 595° C. and 598° C., so as to create an intermediate layer made of delta-phase copper-zinc alloy, between the sub-layer made of gamma-phase copper and zinc alloy and the external layer of epsilon-phase copper and zinc alloy,
- suddenly cooling the wire so as to keep the delta-phase copper-zinc alloy in a metastable state at ambient temperature.

According to a second embodiment, such a process comprises the following stages:
- during stage (a), choosing a blank wire having copper on the surface, for example made of copper, of copper alloy or of copper and zinc alloy,
- dipping this blank wire in a bath of molten zinc at a temperature of between 559° C. and 700° C., preferably between 559° C. and 600° C., more preferably 600° C., so as to create a coating containing a delta-phase copper and zinc alloy,
- suddenly cooling the wire so as to keep the delta-phase copper and zinc alloy in a metastable state.

According to a third embodiment, such a process comprises the following stages:
- during stage (a), choosing a blank wire made of metal, for example made of copper, of copper alloy or of copper and zinc alloy,
- depositing, at the surface of the blank wire, a layer of nickel with a thickness of approximately 5 μm,
- dipping this nickel-coated blank wire in a molten bath of copper and zinc having a zinc content of between 72 and 77 atomic percent and the remainder as copper, and allowing to diffuse at a temperature of between 559° C. and 700° C., preferably between 559° C. and 600° C., more preferably 600° C., so as to create a coating made of delta-phase copper and zinc alloy,
- suddenly cooling the wire thus obtained so as to keep the delta-phase copper and zinc alloy in a metastable state at ambient temperature.

According to a fourth embodiment, such a process comprises the following stages:
- during stage (a), choosing a blank wire made of metal, for example made of copper, of copper alloy or of copper and zinc alloy,
- depositing, at the surface of the blank wire, a layer of nickel with a thickness of approximately 5 μm,
- coextruding this nickel-coated blank wire with a copper and zinc alloy having a zinc content of between 72 and 77 atomic percent and kept at a temperature of between 559° C. and 700° C., preferably at 600° C., so as to create a coating having a layer made of delta-phase copper and zinc alloy on this nickel-coated blank wire,
- suddenly cooling the wire thus coated immediately after the coextrusion, so as to keep the delta-phase copper and zinc alloy in a metastable state at ambient temperature.

According to a fifth embodiment, such a process comprises the following stages:
- during stage (a), choosing a metallic blank wire, for example made of copper, of copper alloy or of copper and zinc alloy,
- depositing, at the surface of the metallic blank wire, a layer of nickel with a thickness of approximately 5 μm,
- depositing, on the layer of nickel, a layer of copper and then a layer of zinc, in proportions between the copper and the zinc of between 72 and 77 atomic percent of zinc, with an excess of zinc chosen in order to compensate for the unavoidable evaporation of a part of the zinc during the subsequent diffusion stage,
- allowing to diffuse at a temperature of between 559° C. and 700° C., preferably between 559° C. and 600° C., more preferably 600° C., so as to create a coating having a layer made of delta-phase copper-zinc alloy,
- suddenly cooling the wire thus coated so as to keep the delta-phase copper-zinc alloy in a metastable state at ambient temperature.

According to a sixth embodiment, such a process comprises the following stages:
- during stage (a), choosing a blank wire made of metal, for example a blank wire made of copper, of copper alloy or of copper-zinc alloy, the blank wire being intended to constitute the core of the electrical discharge machining wire,
- during stage (b), producing, on the blank wire, by aqueous-phase electrodeposition, a coating of copper and zinc, the composition of which is that of the delta phase,
- bringing the wire to a temperature of between 559° C. and 700° C., preferably between 559° C. and 600° C., more preferably between 595° C. and 598° C., so as to create a coating made of delta-phase copper-zinc alloy,
- suddenly cooling the wire thus coated so as to keep the delta-phase copper-zinc alloy in a metastable state at ambient temperature.

In practice, in order to carry out stage (b) of aqueous-phase electrodeposition of the copper and zinc coating, the composition of which is that of the delta phase, the blank wire constitutes the cathode, and use is made of an anode for example made of copper and zinc alloys in proportions between the copper and the zinc of between 72 and 77 atomic percent of zinc, that is to say in an appropriate mixture of gamma and epsilon phases at ambient temperature. The electrolysis bath is adapted in order to deposit a coating, the composition of which is that of the delta phase, preferably with 76% zinc in the deposit. For example, such a bath can contain:
- water as solvent,
- 17 g per liter of copper cyanide CuCN,
- 60 g per liter of zinc cyanide $Zn(CN)_2$,
- 60 g per liter of sodium cyanide NaCN,
- 60 g per liter of sodium hydroxide NaOH,
- 0.4 g per liter of sodium sulfide $Na_2S.9H_2O$,
- at a temperature of 20 to 80° C.,
- with a current density of 1 to 10 $A/dm^2$.

The advantage of the electrodeposition of a copper-zinc alloy is that its composition is constant in the thickness of the coating, unlike the diffusion of zinc on a copper or brass substrate, which exhibits a composition gradient in the absence of a barrier layer.

A feature which the above processes have in common is that they produce, in the coating of the electrode wire, at least one zone made of copper-zinc alloys, the mean composition of which corresponds to the range of existence of the delta-phase copper-zinc alloy at equilibrium, which zone is subsequently brought to a temperature at which the delta phase is produced and remains stable, then the electrode wire is suddenly cooled in order to keep the delta phase in a metastable state at ambient temperature.

Each of the above processes can comprise a subsequent stage of drawing the electrode wire in order to bring it to its final operational diameter.

BRIEF DESCRIPTION OF THE DRAWINGS

Other subject matters, characteristics and advantages of the present invention will emerge from the following description of specific embodiments, which description is given in connection with the appended figures, among which.

DESCRIPTION OF THE PREFERRED EMBODIMENTS

Figure 1:
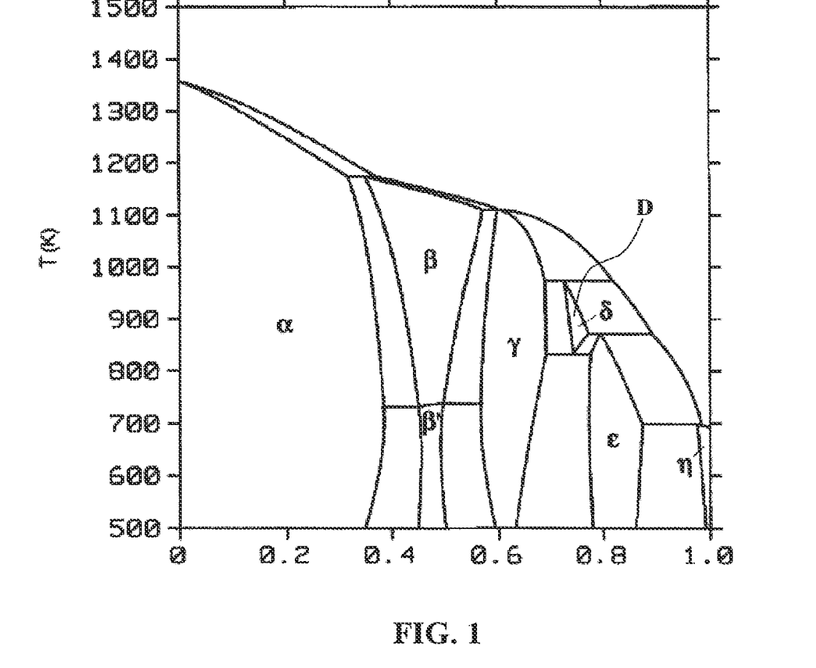
FIG. 1 is a phase diagram of the copper-zinc system at equilibrium, with the atomic concentration (molar fraction) of zinc on the abscissa and with the temperature, expressed in degrees Kelvin, on the ordinate.

First of all, in FIG. 1, the phase diagram of the copper-zinc system at equilibrium is considered.

It is noted that the delta phase is stable in a reduced range D in which the zinc concentration is between 72 and 77 atomic percent and in which the temperature is between 559° C. and 700° C.

Thus, in the zones made of delta-phase copper-zinc alloy of an electrode wire, the zinc content varies continuously while remaining between 72 and 77 atomic percent the remainder being copper, and the unavoidable impurities. The delta phase of the copper-zinc alloy has a specific crystallographic structure which can be identified by various means, for example by X-ray diffraction or by neutron diffraction. This specific crystallographic structure makes it possible to distinguish the delta phase of the copper-zinc system with respect to a mixture of fine grains made of gamma-phase brass and of fine grains made of epsilon-phase brass, which mixture would have the same overall composition. The crystallographic structure of the delta phase of the copper-zinc system, in its stable state at a temperature of 600° C., was published in 1971 by J. Lenz and K. Schubert in the Zeitschrift für Metallkunde, vol. 62, pages 810-816.

The zones of delta-phase copper and zinc alloy can only be obtained between 559° C. and 700° C., and must subsequently undergo a quenching, that is to say a sudden cooling, to bring them from 559° C. to ambient temperature in a short period of time, in order to retain their crystalline structure at ambient temperature. In practice, the quenching can be carried out by passing the electrode wire through liquid water, preferably at a temperature close to ambient temperature, before the temperature of the electrode wire drops below 559° C.

At temperatures of less than 559° C., in particular at ambient temperature, the zones of delta-phase copper and zinc alloy are in a metastable state. In such a metastable state, the transformation of the delta phase into the gamma phase is very slow, almost imperceptible after manufacture, under the conditions of storage, of transportation and of supply of the electrode wires to the machining zone of the device for electrical discharge machining.

As already indicated above, when they are subjected to an intense and short-lived machining spark, the zones of delta-phase copper-zinc alloy produce less liquid, and this favors obtaining a high speed of machining by electrical discharge machining.

It is likely that this effect, which has been observed, results from the following specific physical properties of the delta phase of the copper-zinc system.

A first physical property is linked to the metastable state of the delta phase of the copper-zinc system at ambient temperature. In fact, the molar free enthalpy of the delta phase is greater than those of the gamma phase and of the epsilon phase. Evaporation of the delta phase is therefore potentially favored by this excess of energy. The amount of heat which a spark must release to heat the delta phase from 25° C. to 561° C. is less than that required to heat a mixture of the gamma and epsilon phases of the same overall composition between the same temperatures.

A second physical property of the delta phase of the copper-zinc system is its peritectic decomposition when the temperature rises starting from 561° C. This property appears on the phase diagram of FIG. 1, by the horizontal line limiting the high end of the delta phase range. This means that the melting of the delta phase, from the high end of the delta phase range, must be accompanied by a phase change to the solid state in order to produce the gamma phase. In point of fact, the speed of the phase change to the solid state is potentially limited by the diffusion of atoms in the solid state, a diffusion which is slower than the diffusion in the liquid state. Thus, under the conditions of the machining spark, the melting of the delta phase is potentially slower than the evaporation of the metal. An interface is thus produced between the solid and its vapor, without significant presence of a liquid between the two.

Figure 2:
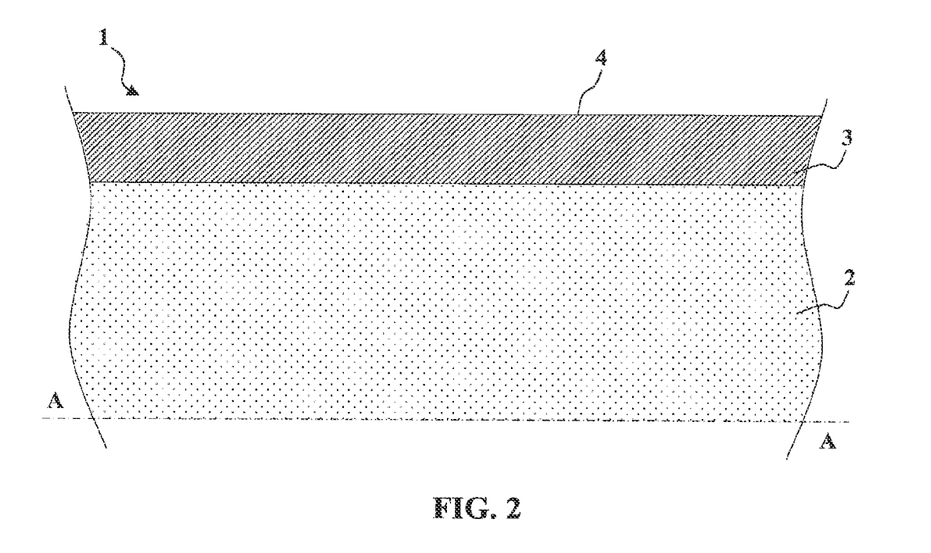
FIG. 2 is a side view in longitudinal half-section of an electrode wire of the prior art, having a core and continuous coating, before production of an electrical discharge machining spark.

In FIG. 2, there has been diagrammatically illustrated a partial longitudinal section of an electrode wire 1 having a core 2 and a continuous coating 3, before the action of a spark. The coating then exhibits a generally smooth, that is to say generally cylindrical, surface 4 along the longitudinal axis A-A of the electrode wire 1.

Figure 3:
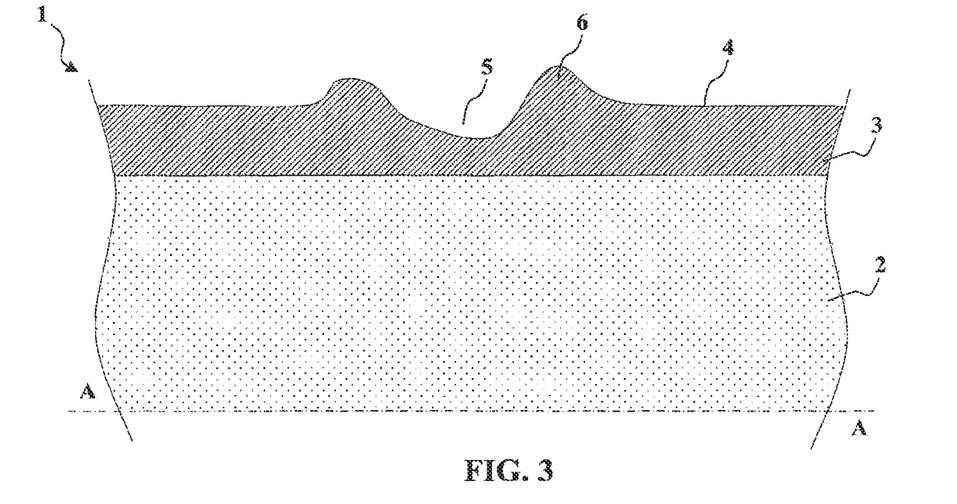
FIG. 3 is a side view in longitudinal half-section of the electrode wire of FIG. 2, after production of an electrical discharge machining spark.

In FIG. 3, there has been diagrammatically illustrated the same partial longitudinal section of this same electrode wire 1 with a continuous coating 3 after a machining spark. The spark produced a crater 5, surrounded by a bead 6 of material which was melted and re-solidified.

Figure 4:
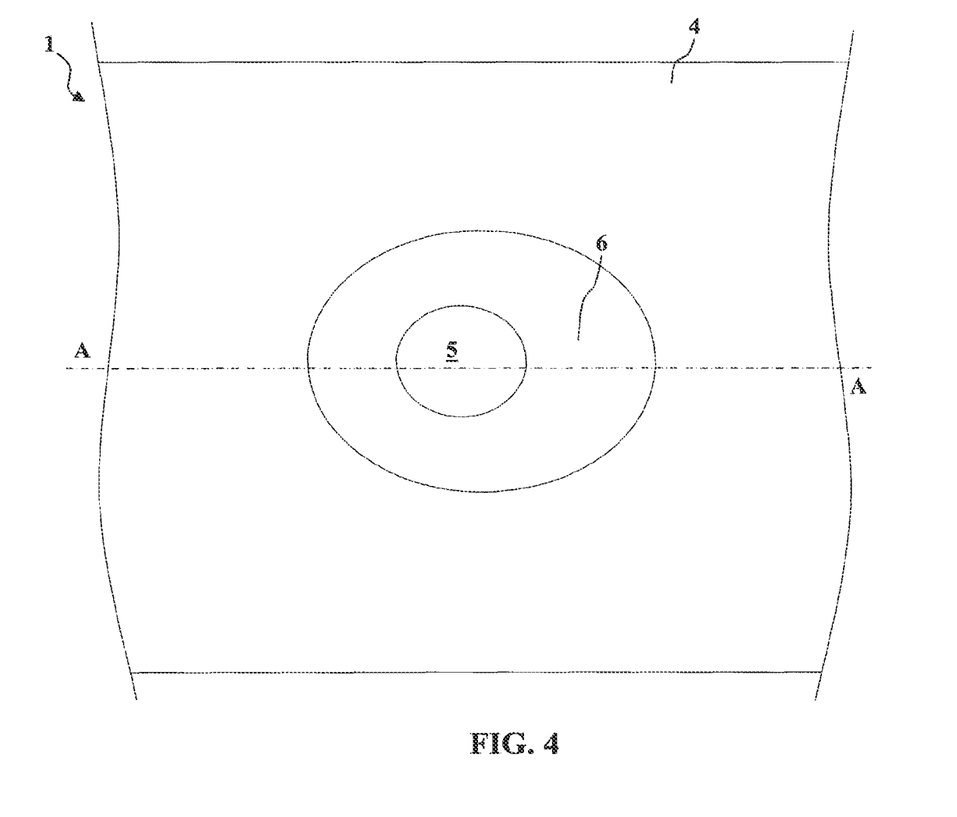
FIG. 4 is a top view of the electrode wire of FIG. 3, after production of an electrical discharge machining spark.

FIG. 4 diagrammatically illustrates, in top view, the section of the electrode wire 1 with the crater 5 and its bead 6.

It is understood that the material which forms the bead 6 was moved while it was in the liquid state under the effect of the heating due to the spark. The material which forms the bead 6 results from the melting of the alloy(s) previously present in the coating, and the resulting alloy phase may be different from that of the alloy(s) previously present, and no longer has the same erosion effect during the action of the subsequent sparks in the machining zone.

The present invention, by the presence of zones made of delta-phase copper-zinc alloy, makes it possible to reduce the depth of the crater, or its diameter, or the thickness of the bead of re-solidified material. Thus, the electrode wire of the invention loses less material at each spark, and the material remaining on the surface of the electrode wire better retains its properties which were present before the spark.

Figure 5:
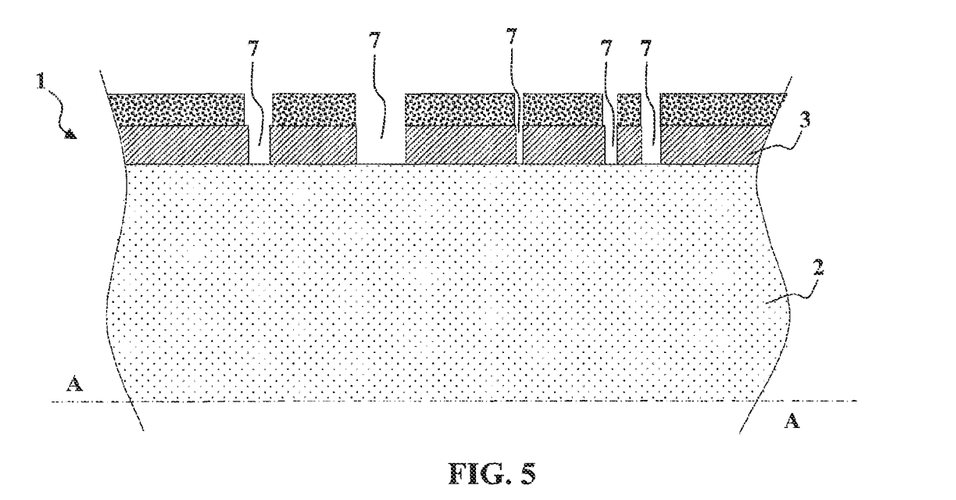
FIG. 5 is a side view in longitudinal half-section of an electrode wire of the prior art, having a core and fractured coating, before production of an electrical discharge machining spark.

In the embodiment diagrammatically illustrated in FIG. 5, showing a partial longitudinal section of an electrode wire 1 having a core 2 and coating 3, before the action of a spark, the coating 3 exhibits fractures 7.

Figure 6:
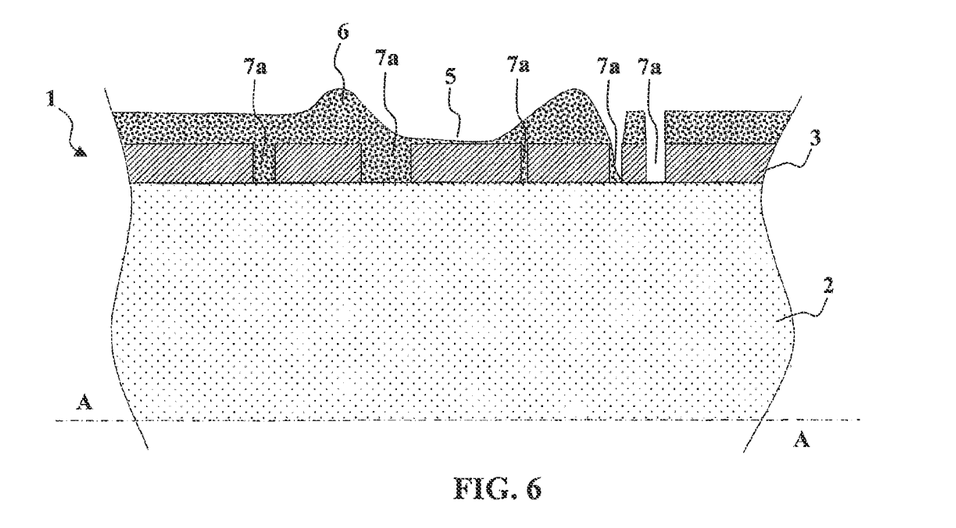
FIG. 6 is a side view in longitudinal half-section of the electrode wire of FIG. 5, after production of an electrical discharge machining spark.

In FIG. 6, there has been diagrammatically illustrated the same partial longitudinal section of this same electrode wire 1 having a fractured coating 3 after a machining spark. The spark produced a crater 5, surrounded by a bead 6 of material which was melted and re-solidified.

It is understood that the material which forms the bead 6 was moved while it was in the liquid state under the effect of heating due to the spark, and came to cover certain fractures or pores 7a, so that the latter can no longer be used to perform their technical effects during the subsequent sparks.

The present invention, by the presence of the zones made of delta-phase copper-zinc alloy, makes it possible to reduce the amount of liquefied material, and thus makes it possible to better preserve the presence of the fractures or pores 7, which perform their functions during the subsequent sparks.

Figure 7:
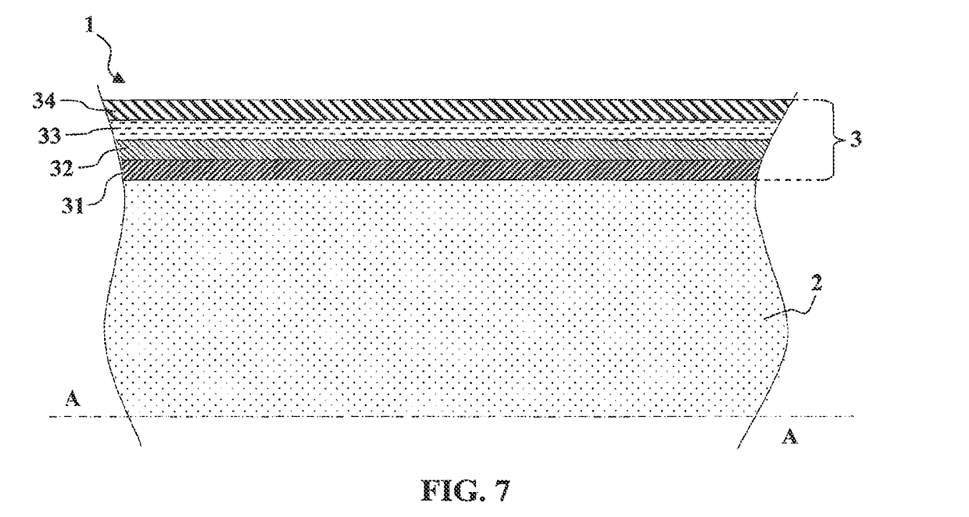
FIG. 7 is a side view in longitudinal half-section of an electrode wire according to one embodiment of the present invention.

In the embodiment illustrated in FIG. 7, the coating 3 of the electrode wire 1 comprises a lower layer 31 of beta-phase copper-zinc alloy, surmounted by a continuous first intermediate layer 32 of gamma-phase copper and zinc alloy, itself surmounted by a second intermediate layer 33 of delta-phase copper-zinc alloy, itself surmounted by a surface layer 34 of epsilon-phase copper and zinc alloy.

Figure 8:
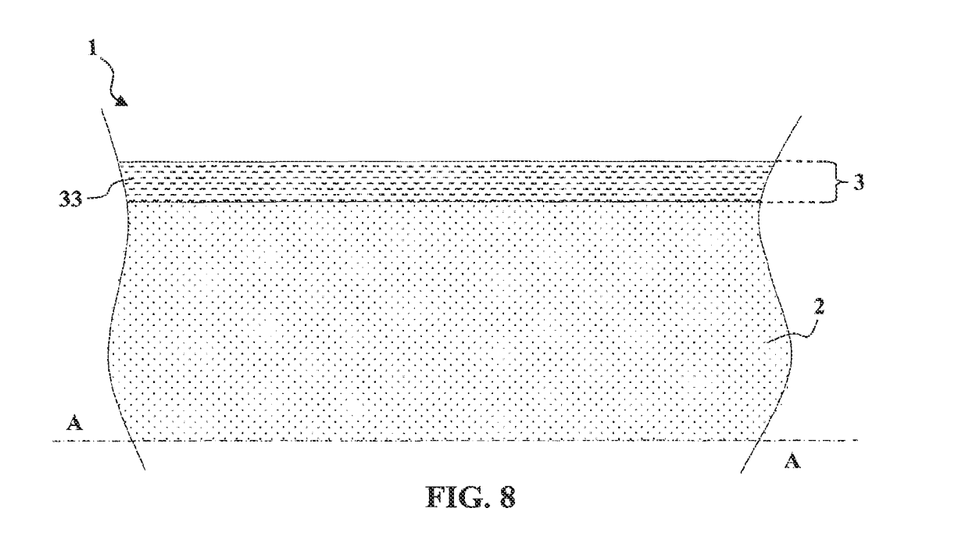
FIG. 8 is a side view in longitudinal half-section of an electrode wire according to another embodiment of the present invention.

In the embodiment illustrated in FIG. 8, the coating 3 of the electrode wire 1 comprises a single layer 33 of delta-phase copper-zinc alloy, covering the core 2.

Figure 9:
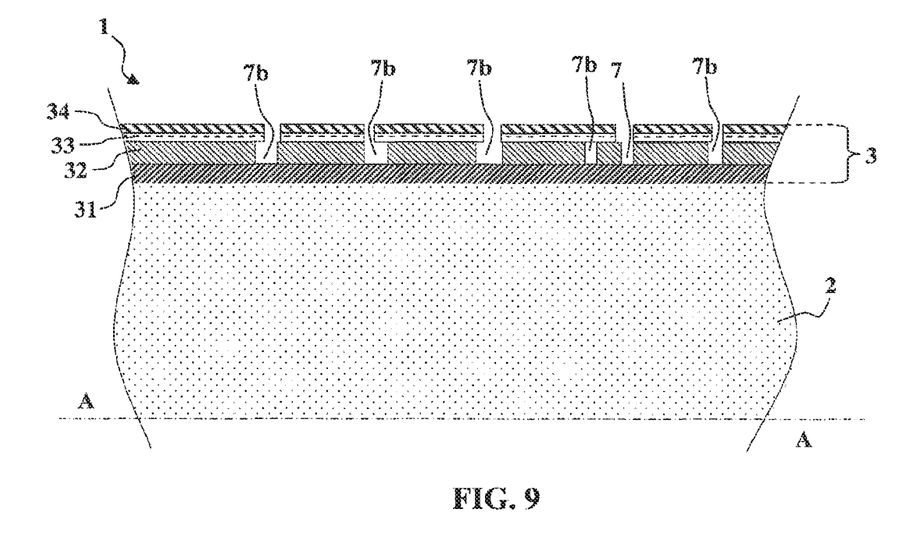
FIG. 9 is a side view in longitudinal half-section of an electrode wire according to another embodiment of the present invention.

In the embodiment illustrated in FIG. 9, the coating 3 of the electrode wire 1 comprises a lower layer 31 of beta-phase copper-zinc alloy, surmounted by a fractured first intermediate layer 32 of gamma-phase copper-zinc alloy, itself surmounted by a second intermediate layer 33 of delta-phase copper-zinc alloy, itself surmounted by a surface layer 34 of epsilon-phase copper-zinc alloy. In this embodiment, the second intermediate layer 33 and the surface layer 34 partially cover some fractures or pores 7b of the first intermediate layer 32, forming covered pores. During a spark, the presence of zones such as the layer 33 made of delta-phase copper-zinc alloy reduces the risk of disappearance of such covered fractures or pores 7b, which covered pores 7b are favorable for obtaining a high speed of machining by electrical discharge machining with such an electrode wire 1.

The present invention is not limited to the embodiments which have been explicitly described but includes the various alternative forms and generalizations thereof contained within the scope of the claims below.

The invention claimed is:

1. An electrode wire for machining by electrical discharge machining, said electrode wire comprising:
    a metallic core, made of one or more layers of metal or of metallic alloy,
    on the metallic core, a coating having an alloy different from that of the metallic core and containing more than 50% by weight of zinc,
    wherein the coating comprises delta-phase copper-zinc alloy.

2. The electrode wire as claimed in claim 1, wherein delta-phase copper-zinc alloy forms at least one layer of alloy in the coating.

3. The electrode wire as claimed in claim 2, wherein said at least one layer of delta-phase copper-zinc alloy is fractured.

4. The electrode wire as claimed in claim 2, wherein said at least one layer of delta-phase copper-zinc alloy is a surface layer of the coating.

5. The electrode wire as claimed in claim 2, wherein the coating comprises a fractured layer of gamma-phase copper-zinc alloy surmounted by said at least one layer of delta-phase copper-zinc alloy.

6. The electrode wire as claimed in claim 5, wherein said at least one layer of delta-phase copper-zinc alloy has a thickness of between 30% and 100% of the thickness of said fractured layer of gamma-phase copper-zinc alloy.

7. The electrode wire as claimed in claim 5, wherein the layer of gamma-phase copper-zinc alloy contains pores which are covered by said at least one layer of delta-phase copper-zinc alloy.

8. The electrode wire as claimed in claim 2, wherein the coating comprises a layer of beta-phase copper-zinc alloy, surmounted by a fractured layer of gamma-phase copper-zinc alloy, surmounted by said at least one layer of delta-phase copper-zinc alloy, itself surmounted by a layer of epsilon-phase copper-zinc alloy.

9. A process for manufacturing an electrode wire for machining by electrical discharge machining, said electrode wire comprising a metallic core and a coating comprising delta-phase copper-zinc alloy, which process comprises the following stages:
    (a) taking a blank wire made of metal,
    (b) producing, on this blank wire, a coating having zones, the mean composition of which corresponds to the range of existence of the delta-phase copper-zinc alloy,
    (c) bringing the coated blank wire to a temperature of between 559° C. and 700° C., at which temperature the copper-zinc alloy delta phase is stable,
    (d) suddenly cooling the coated blank wire so as to keep the delta-phase copper-zinc alloy in a metastable state at ambient temperature.

10. The process as claimed in claim 9, comprising the following stages:
    during stage (a), choosing a blank wire having copper on the surface,
    producing a first coating of zinc on this blank wire,
    carrying out a first diffusion heat treatment so as to obtain a sub-layer of beta-phase copper and zinc alloy and an external layer of gamma-phase copper and zinc alloy,
    producing a second coating of zinc,
    carrying out a second diffusion heat treatment at a temperature of less than 170° C. so as to obtain, at the surface of the wire, an external layer made of epsilon-phase copper and zinc alloy while retaining the lower layers made of beta-phase copper-zinc alloy and gamma-phase copper-zinc alloy previously produced,
    bringing the wire to a temperature of between 559° C. and 700° C., so as to create an intermediate layer made of delta-phase copper and zinc alloy, between the sub-layer made of gamma-phase copper and zinc alloy and the external layer of epsilon-phase copper and zinc alloy (34),
    suddenly cooling the wire so as to keep the delta-phase copper and zinc alloy in a metastable state at ambient temperature.

11. The process as claimed in claim 9, which process comprises the following stages:
    during stage (a), choosing a blank wire having copper on the surface,
    dipping this blank wire in a bath of molten zinc at a temperature of between 559° C. and 700° C., so as to create a coating made of delta-phase copper and zinc alloy,
    suddenly cooling the wire so as to keep the delta-phase copper and zinc alloy in a metastable state.

12. The process as claimed in claim 9, which process comprises the following stages:
   during stage (a), choosing a blank wire made of metal,
   depositing, at the surface of the blank wire, a layer of nickel with a thickness of approximately 5 μm,
   dipping this nickel-coated blank wire in a molten bath having a zinc content of between 72 and 77 atomic percent and the remainder as copper, and allowing to diffuse at a temperature of between 559° C. and 700° C., so as to create a coating made of delta-phase copper and zinc alloy,
   suddenly cooling the wire so as to keep the delta-phase copper and zinc alloy in a metastable state at ambient temperature.

13. The process as claimed in claim 9, which process comprises the following stages:
   during stage (a), choosing a blank wire made of metal,
   depositing, at the surface of the blank wire, a layer of nickel with a thickness of approximately 5 μm,
   coextruding this nickel-coated blank wire with a delta-phase copper and zinc alloy having a zinc content of between 72 and 77 atomic percent and kept at a temperature of between 559° C. and 700° C., so as to create a coating made of delta-phase copper and zinc alloy on this nickel-coated blank wire,
   suddenly cooling the wire thus coated immediately after the coextrusion, so as to keep the delta-phase copper and zinc alloy in a metastable state at ambient temperature.

14. The process as claimed in claim 9, which process comprises the following stages:
   during stage (a), choosing a metallic blank wire,
   depositing, at the surface of the metallic blank wire, a layer of nickel with a thickness of approximately 5 μm,
   depositing, on the layer of nickel, a layer of copper and then a layer of zinc, in proportions between the copper and the zinc of between 72 and 77 atomic percent of zinc, with an excess of zinc chosen in order to compensate for the unavoidable evaporation of a part of the zinc during the subsequent diffusion stage,
   allowing to diffuse at a temperature of between 559° C. and 700° C., so as to create a coating having a layer made of delta-phase copper-zinc alloy,
   suddenly cooling the wire thus coated so as to keep the delta-phase copper-zinc alloy in a metastable state at ambient temperature.

15. The process as claimed in claim 9, in which stage (b) of producing the coating is carried out by aqueous-phase electrodeposition, using the blank wire as cathode, and using an anode made of copper and zinc alloys with a composition close to the delta phase.

16. The process as claimed in claim 9, comprising a subsequent stage of drawing.

* * * * *